United States Patent
Blanchard

(10) Patent No.: US 9,038,782 B2
(45) Date of Patent: May 26, 2015

(54) ELEVATOR LOAD BEARING MEMBER VIBRATION CONTROL

(75) Inventor: Antoine Adrian Blanchard, Glen (FR)

(73) Assignee: Otis Elevator Company, Farmington, CT (US)

( * ) Notice: Subject to any disclaimer, the term of this patent is extended or adjusted under 35 U.S.C. 154(b) by 871 days.

(21) Appl. No.: 13/201,675

(22) PCT Filed: Mar. 20, 2009

(86) PCT No.: PCT/IB2009/005384
§ 371 (c)(1),
(2), (4) Date: Aug. 16, 2011

(87) PCT Pub. No.: WO2010/106392
PCT Pub. Date: Sep. 23, 2010

(65) Prior Publication Data
US 2011/0297489 A1    Dec. 8, 2011

(51) Int. Cl.
*B66B 7/08* (2006.01)
*B66B 7/10* (2006.01)
*F16G 11/00* (2006.01)
*F16G 11/04* (2006.01)

(52) U.S. Cl.
CPC ... *B66B 7/08* (2013.01); *B66B 7/10* (2013.01); *F16G 11/00* (2013.01)

(58) Field of Classification Search
CPC .................................. B66B 7/085; B66B 7/01
USPC ................ 187/345, 347, 411, 412; 24/115 G, 24/115 L, 115 M, 136 K, 136 L; 254/277; 403/211

IPC ........................................................ F16G 11/00
See application file for complete search history.

(56) References Cited

U.S. PATENT DOCUMENTS

| | | | |
|---|---|---|---|
| 4,079,816 A | 3/1978 | Ohta | |
| 4,548,297 A | 10/1985 | Salmon et al. | |
| 5,103,937 A * | 4/1992 | Robertson | 187/414 |
| 5,490,577 A * | 2/1996 | Yoo | 187/252 |
| 5,564,530 A * | 10/1996 | Iwakiri et al. | 187/411 |
| 5,862,888 A * | 1/1999 | Iwakiri et al. | 187/345 |
| 6,065,569 A * | 5/2000 | Fuller | 187/345 |
| 6,216,824 B1 | 4/2001 | Fuller et al. | |
| 6,267,205 B1 | 7/2001 | Piech et al. | |
| 6,336,523 B1 | 1/2002 | Ozeki et al. | |

(Continued)

FOREIGN PATENT DOCUMENTS

| | | |
|---|---|---|
| CN | 101219748 A | 7/2008 |
| JP | 47-51625 | 12/1972 |

(Continued)

OTHER PUBLICATIONS

Patent & Utility Model Gazette, Machine Translation of JP2001335257A, May 17, 2014, pp. 1-4.*

(Continued)

*Primary Examiner* — Michael Mansen
*Assistant Examiner* — Stefan Kruer
(74) *Attorney, Agent, or Firm* — Carlson, Gaskey & Olds

(57) ABSTRACT

An exemplary device that is useful for controlling vibrations of an elevator load bearing member includes a guide. A mass is moveable relative to the guide responsive to vibration of the load bearing member to introduce a force to counter the vibration.

14 Claims, 2 Drawing Sheets

(56) References Cited

U.S. PATENT DOCUMENTS

| | | |
|---|---|---|
| 2001/0025744 A1 | 10/2001 | Ach |
| 2006/0266591 A1 * | 11/2006 | Zhu et al. ................. 187/411 |

FOREIGN PATENT DOCUMENTS

| | | | | |
|---|---|---|---|---|
| JP | 48-36026 | | 11/1973 | |
| JP | 8225272 | | 9/1996 | |
| JP | 2001335257 A | * | 12/2001 | ............ B66B 7/08 |
| JP | 2001348174 A | * | 12/2001 | ............ B66B 7/10 |
| JP | 2003192242 | | 7/2003 | |
| JP | 2005162391 | | 6/2005 | |
| JP | 2008168980 | | 7/2008 | |
| WO | 2005087646 A1 | | 9/2005 | |

OTHER PUBLICATIONS

International Search Report and Written Opinion of the International Searching Authority for International Application No. PCT/IB2009/005384 mailed Jan. 5, 2010.

Chinese Search Report for Application No. 200980158310.3 dated Mar. 22, 2013.

* cited by examiner

ELEVATOR LOAD BEARING MEMBER VIBRATION CONTROL

BACKGROUND

Elevators are useful for carrying passengers, cargo or both between various levels in a building. Traction-based elevators utilize a roping arrangement including load bearing members that suspend the elevator car. An elevator machine causes selected movement of the roping arrangement to achieve the desired movement of the elevator car.

One concern with elevator systems is providing a sufficient ride quality. One aspect of ride quality is the level of noise that is noticeable to passengers. A quieter elevator system provides a better ride quality than one that is relatively louder.

There are various factors that contribute to noises in an elevator system. One contributing factor is vibration of the roping arrangement. Under certain operating conditions, the load bearing members of the roping arrangement are excited into a vibrational mode. Depending on the frequency of those vibrations, there can be resulting noise that is transmitted into the elevator cab and noticeable by passengers. It is desirable to minimize such vibrations to limit or eliminate the associated noise.

SUMMARY

An exemplary device that is useful for controlling vibrations of an elevator load bearing member includes a guide. A mass is moveable relative to the guide responsive to vibration of the load bearing member to introduce a force to counter the vibration.

An exemplary elevator system includes an elevator car. A load bearing member supports the elevator car and facilitates movement of the elevator car. A vibration control device is configured to control vibration of the load bearing member. That device includes a guide and a mass that is moveable relative to the guide in response to vibration of the load bearing member to introduce a force to counter the vibration An exemplary method of controlling vibration of a load bearing member in an elevator system includes providing a mass that is moveable in response to vibration of the load bearing member. Movement of the mass is controlled to introduce a force to counter the vibration.

The various features and advantages of the disclosed examples will become apparent to those skilled in the art from the following detailed description. The drawings that accompany the detailed description can be briefly described as follows.

DETAILED DESCRIPTION

Figure 1:
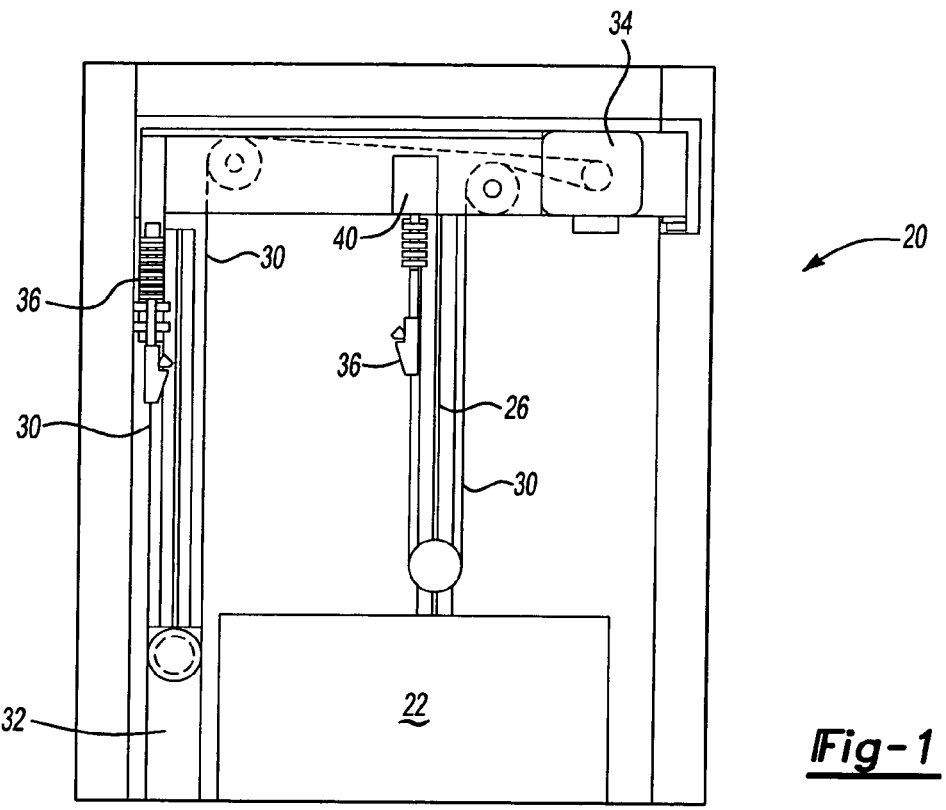
FIG. 1 diagrammatically and schematically illustrates selected portions of an elevator system.

FIG. 1 illustrates selected portions of an elevator system 20. An elevator cab 22 moves along guide rails 26. A roping arrangement suspends the elevator car frame 24 and facilitates movement of the car along the guide rails 26. In the illustration, one load bearing member 30 of the roping arrangement is shown. As known, a plurality of load bearing members 30 may be included in a roping arrangement to meet the needs of a particular situation. In one example, the load bearing members comprise flat belts such as the type having metallic cords in a polymer jacket.

A counterweight 32 is also suspended by the load bearing member 30. A machine 34 causes selected movement of the load bearing member 30 to achieve the desired movement of the elevator car and counterweight.

In the illustrated example, terminations 36 are associated with ends of the load bearing member 30. The illustration shows a 2:1 roping arrangement. Other roping arrangements as known are possible.

A vibration control device 40 is associated with the load bearing member 30. The vibration control device 40 responds to vibration of the load bearing member 30 by introducing a force to counter the vibration. In one example, the force introduced by the vibration control device 40 has a phase that is opposite to the phase of the vibration at the frequency of vibration of the load bearing member 30. The vibration control device 40 is tuned to provide the counter force at the resonant frequency of the vibration of the load bearing member. The counter force reduces or eliminates the vibration of the load bearing member 30, which reduces noise otherwise associated with such vibration. The vibration control device 40 reduces vibration in a longitudinal direction, for example.

In the illustrated example, the vibration control device 40 is associated with one of the terminations 36. Placing the vibration control device at the location of a termination 36 allows for introducing the counter force so that it can reduce or eliminate vibration of the load bearing member 30 from a location where the vibration control device 40 will not interfere with movement or operation of other elevator system components.

Figure 2:
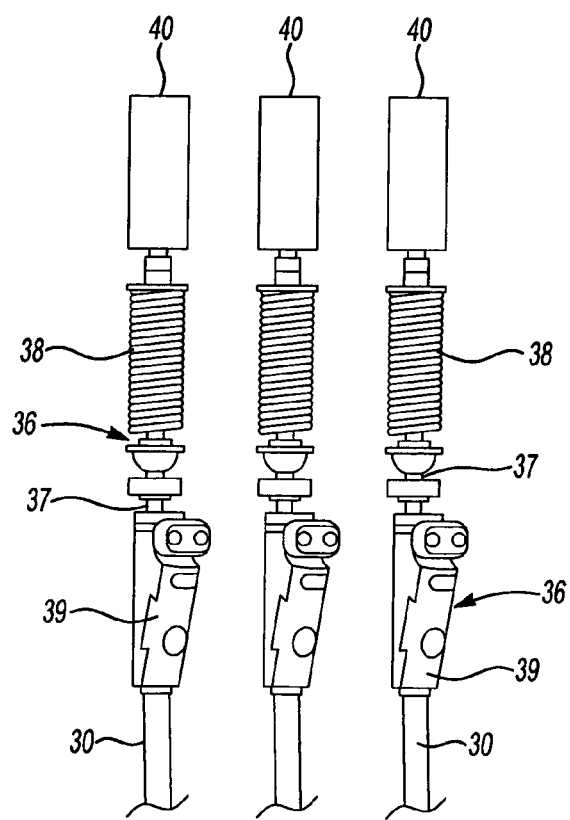
FIG. 2 schematically illustrates a termination arrangement and a vibration control device arrangement.

FIG. 2 schematically illustrates one example termination and vibration control arrangement. In this example, there are three load bearing members 30, each having an associated termination 36. The illustrated example includes thimble rods 37, springs 38 and sockets 39 as known. Other termination styles may be used with a vibration control device 40 consistent with the disclosed examples. It is also possible to locate the vibration control device 40 apart from a termination provided that it is able to introduce the counter force to the load bearing assembly.

Each of the illustrated terminations 36 has a corresponding vibration control device 40 associated with it. In this example, each load bearing member 30 has a dedicated vibration control device 40. Another example has a single vibration control device 40 associated with more than one of the load bearing members 30. Providing individual vibration control devices 40 for each of the load bearing members 30 allows for tuning each vibration control device relative to its corresponding load bearing member 30 to achieve a desired level of vibration control.

Figure 3:
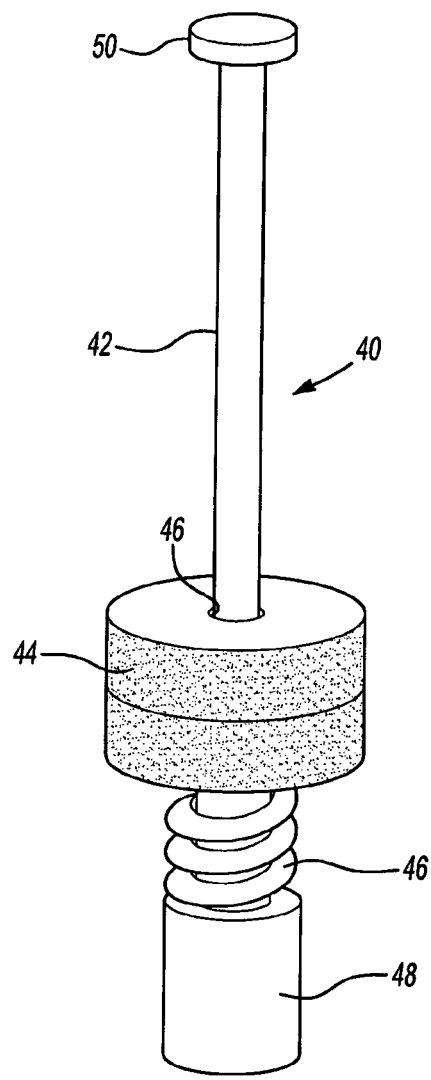
FIG. 3 schematically shows one example vibration control device.

FIG. 3 schematically illustrates one example vibration control device 40. A guide 42 in this example comprises a rod. A mass 44 and a spring 46 operate as a mechanical resonator. A mechanical, coil spring is illustrated for discussion purposes. The operation of the spring 46 may be realized with components other than mechanical or coil springs. One end of the spring 46 in this example is secured to the mass 44 and another end is secured to a connector 48. The spring 46 in one example operates entirely independent of the spring 38 of an associated termination. The spring of an associated termination is intended to tension the load bearing member in a known manner. The spring 46 controls movement of the mass 44 to provide the counter force at a desired frequency and with a desired phase to have a desired vibration control effect. In this example, the spring 46 controls movement of the mass 44 in two opposite directions.

In situations where the vibration control device is associated with a termination 36, the connector 48 is attached to an end of a thimble rod, for example. Other types of connections are possible provided that the vibration control device 40 is situated relative to the load bearing members 30 to have the desired vibration control effect.

Figure 4:
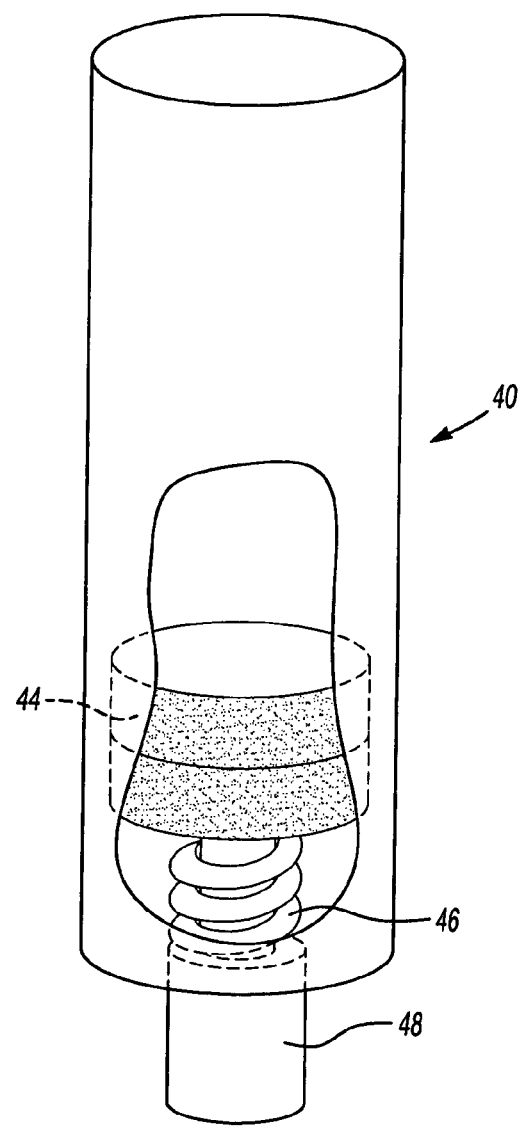
FIG. 4 schematically shows another example vibration control device.

FIG. 4 schematically illustrates another example vibration control device 40. In this example, the guide 42 comprises a sleeve. The mass 44 in this example is received within the sleeve.

The mass 44 in either example is moveable along the guide 42 in two opposite directions subject to the stiffness of the spring 46. In other words, the stiffness of the spring 46 controls movement of the mass 44. The size of the mass 44 and the stiffness of the spring 46 are selected so that the resonance of the mass 44 and spring 46 corresponds to a resonant frequency of vibration of the load bearing member 30. The force introduced by the movement of the mass 44 has a phase that is the opposite of the phase of the vibration at the resonant frequency of vibration. Such a counter force reduces or eliminates the vibration of the load bearing member.

Under certain elevator system operating conditions, the load bearing member 30 will be excited into a vibrational mode. In the case of a flat belt, the vibrational mode may be referred to as a longitudinal mode. This is a structural mode in which the load bearing member 30 is moving in a longitudinal direction and vibration occurs. Such vibration of an associated load bearing member 30 excites the mass 44 and spring 46 such that the mass 44 moves along the guide 42. Such movement of the mass 44 introduces a force that is experienced by the load bearing member. The vibration control device 40 provides a counter force to the forces associated with the vibration of the load bearing member 30 because of the responsive movement of the mass 44.

The size of the mass 44 and the stiffness of the spring 46 are selected so that the counter force provided by the vibration control device 40 is at the frequency of the excited mode of the load bearing member 30 and has a phase that is the opposite of the phase to its vibrations. In the case of a coil spring 46, the spring constant and the size of the mass 44 are selected to achieve a resonance that corresponds to the resonant frequency of vibration of the load bearing member 30 that is of concern for purposes of noise control. The spring 46 effectively controls the frequency of movement of the mass 44 when the load bearing member is excited to a vibrational mode. By achieving a resonance of the mass-spring combination, a sufficient counter force opposite in phase to the vibrations of the load bearing member 30 is produced to at least reduce or minimize such vibrations. By reducing or minimizing such vibrations, the corresponding resulting noise can be significantly reduced or possibly eliminated.

In one example, individual vibration control devices 40 are associated with each load bearing member (e.g., FIG. 2) and their resonance characteristics (i.e., the size of the mass 44 and the stiffness of the spring 46) are tuned for each load bearing member on an individual basis to achieve the desired resonance for maximizing vibration control. The size of the mass 44 and the spring constant of the spring 46 will vary depending on the characteristics of the elevator system. For different hoistway heights, sizes of load bearing members and operating speeds, different sizes for the mass 44 and different spring stiffnesses may be required.

In one example, the vibration control device 40 should be tuned at 240 Hz for a one meter per second speed with the mass 44 selected to be approximately one-tenth of the mass of the load bearing member. In an example where there is a 15 meter rise for the elevator system, a mass of 0.66 kg and a spring constant of 1.5e6 N/M provides sufficient vibration control to achieve significant noise reduction. In one example, a noise reduction of more than 3 dBA can be achieved using one of the example vibration control devices. The level of noise reduction based upon the corresponding amount of vibration reduction can be modified by tuning the vibration control device by selecting a different mass 44 or a different vibration characteristic (e.g., stiffness) of the spring 46. Given this description, those skilled in the art will be able to select appropriate mass and spring characteristics to meet the needs of their particular situation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A device useful for controlling vibrations of an elevator load bearing member, comprising:
   a guide associated with a termination, the termination comprising a first spring that tensions the load bearing member;
   a mass that is moveable along the guide responsive to vibration of the load bearing member to introduce a force to counter the vibration; and
   a second spring associated with the mass for controlling movement of the mass, the second spring being secured to the mass at one end of the second spring, the second spring operating independent of the first spring, wherein the second spring has a stiffness that cooperates with the mass to cause the introduced force to have a selected phase and a selected frequency, the selected phase being opposite to a phase of the vibration and the selected frequency corresponding to a resonant frequency of the vibration, wherein the guide comprises a sleeve and the mass is received at least partially in the sleeve.

2. The device of claim 1, wherein the second spring comprises a mechanical spring connected with the mass and the second spring controls movement of the mass in two opposite directions.

3. The device of claim 1, wherein the guide comprises a rod that is at least partially received in an opening through the mass.

4. An elevator system, comprising:
   an elevator car;
   a load bearing member supporting the elevator car;
   a vibration control device configured to control vibrations of the load bearing member, the vibration control device including a guide and a mass that is moveable along the guide responsive to vibration of the load bearing member to introduce a force to counter the vibration; and
   a termination associated with one end of the load bearing member and wherein the vibration control device is coupled with the termination, the termination comprising a first spring that tensions the load bearing member,
   wherein the vibration control device further includes a second spring associated with the mass for controlling movement of the mass, the second spring extends around the guide and is being secured to the mass at one end of the second spring, the second spring operating independent of the first spring, wherein the second spring has a stiffness that cooperates with the mass to cause the introduced force to have a selected phase and a selected frequency, the selected phase being opposite to a phase of the vibration and the selected frequency corresponding to a resonant frequency of the vibration, wherein the guide comprises a sleeve and the mass is received at least partially in the sleeve.

5. The elevator system of claim 4, wherein the termination comprises a thimble rod and the guide is secured to the thimble rod.

6. The elevator system of claim 4, wherein the guide comprises a rod and the mass is at least partially received about the rod.

7. The elevator system of claim 4, wherein the second spring comprises a mechanical spring connected to the mass for controlling movement of the mass in two opposite directions.

8. The elevator system of claim 4, wherein there are a plurality of load bearing members and there are a corresponding plurality of vibration control devices such that each of the load bearing member has an associated one of the vibration control devices.

9. The elevator system of claim 5, wherein there is a plurality of load bearing members and the vibration control device is associated with the plurality of load bearing members.

10. The elevator system of claim 4, wherein the vibration control device controls vibration in a longitudinal direction of the load bearing member.

11. A method of controlling vibration of a load bearing member in an elevator system, comprising the steps of:

providing a guide associated with a termination, the termination comprising a first spring that tensions the load bearing member;

providing a mass at a location of a termination, the mass being moveable along the guide in response to vibration of the load bearing member;

providing a second spring for controlling the movement of the mass, the second spring being secured to the mass at one end of the second spring, the second spring operating independent of the first spring; providing the guide with a sleeve and the mass is received at least partially in the sleeve; and controlling movement of the mass to introduce a force to counter the vibration of the load bearing member having a selected frequency and wherein the selected phase is opposite to a phase of the vibration and the selected frequency corresponds to a resonant frequency of the vibration.

12. The method of claim 11,
wherein the second spring has a selected stiffness that cooperates with a size of the mass for achieving the selected phase and the selected frequency.

13. The method of claim 12, comprising
tuning the selected frequency by at least one of
changing the stiffness of the spring or
changing a size of the mass.

14. The method of claim 11, comprising
controlling vibration in a longitudinal direction of the load bearing member.

\* \* \* \* \*

UNITED STATES PATENT AND TRADEMARK OFFICE
CERTIFICATE OF CORRECTION

| | | |
|---|---|---|
| PATENT NO. | : 9,038,782 B2 | Page 1 of 1 |
| APPLICATION NO. | : 13/201675 | |
| DATED | : May 26, 2015 | |
| INVENTOR(S) | : Antoine Adrian Blanchard | |

It is certified that error appears in the above-identified patent and that said Letters Patent is hereby corrected as shown below:

IN THE CLAIMS:

In claim 9, column 5, line 23; delete "5" and replace with --4--

Signed and Sealed this
Twenty-fourth Day of November, 2015

Michelle K. Lee
*Director of the United States Patent and Trademark Office*